United States Patent
Yang et al.

(10) Patent No.: US 12,386,668 B2
(45) Date of Patent: Aug. 12, 2025

(54) COGNITIVE TASK SCHEDULER

(71) Applicant: International Business Machines Corporation, Armonk, NY (US)

(72) Inventors: Shou Qing Yang, Beijing (CN); Li Han, Beijing (CN); Jia Mei Xiu, Beijing (CN); Ming Liang Zu, Beijing (CN); Rong Song Shen, Beijing (CN); Hong Wei Yang, Beijing (CN); Yu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/123,275

(22) Filed: Dec. 16, 2020

(65) Prior Publication Data

US 2022/0188166 A1 Jun. 16, 2022

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/5077* (2013.01)

(58) Field of Classification Search
CPC .... G06F 9/5038; G06F 9/4881; G06F 9/5077; H04L 67/60
See application file for complete search history.

(56) References Cited

U.S. PATENT DOCUMENTS

| | | | |
|---|---|---|---|
| 6,889,243 B1 | 5/2005 | Hondou | |
| 9,929,931 B2 * | 3/2018 | Breitgand | G06F 9/45558 |
| 10,572,840 B2 * | 2/2020 | Fletcher | G06Q 10/06311 |
| 10,841,236 B1 * | 11/2020 | Jin | G06F 9/5072 |
| 11,010,697 B1 * | 5/2021 | Liu | G06N 20/00 |
| 11,074,105 B2 * | 7/2021 | Walby | G06F 9/5038 |
| 11,461,669 B2 * | 10/2022 | von Trapp | G06N 7/01 |
| 2008/0172673 A1 | 7/2008 | Naik | |
| 2017/0052814 A1 * | 2/2017 | Aguiar | G06F 11/3442 |
| 2017/0093639 A1 * | 3/2017 | Dabbagh | H04L 41/12 |
| 2017/0180507 A1 * | 6/2017 | Thierry | G06F 9/505 |
| 2020/0027005 A1 * | 1/2020 | Harrison | H04L 41/16 |
| 2020/0125568 A1 * | 4/2020 | Idicula | G06N 20/20 |

(Continued)

OTHER PUBLICATIONS

Ejarque et al. "Job Scheduling with License Reservation: A Semantic Approach," 2011 19th International Euromicro Conference on Parallel, Distributed and Network-Based Processing, 2011, pp. 47-54. (Year: 2011).*

(Continued)

*Primary Examiner* — Jason D Recek
(74) *Attorney, Agent, or Firm* — Heather Johnston

(57) ABSTRACT

A processor may receive a request for a new computing task to be scheduled. The processor may identify that the new computing task requires processing in a cloud computing environment. The processor may identify resource needs of the new computing task. The processor may predict, utilizing an AI model, a future computing task based on the new computing task, where the future computing task requires processing at a future time in the cloud computing environment. The processor may identify resource needs of the future computing task. The processor may select one or more computing node hosts for processing the new computing task based on the future computing task.

18 Claims, 5 Drawing Sheets

(56) References Cited

U.S. PATENT DOCUMENTS

| | | | | |
|---|---|---|---|---|
| 2020/0125963 | A1* | 4/2020 | von Trapp | G06Q 10/06313 |
| 2020/0257968 | A1* | 8/2020 | Mitra | G06F 9/4881 |
| 2020/0371838 | A1* | 11/2020 | Mandal | G06F 9/4887 |
| 2021/0109779 | A1* | 4/2021 | Kleine | G06F 9/4887 |
| 2021/0117425 | A1* | 4/2021 | Rao | H04L 9/0866 |
| 2022/0166848 | A1* | 5/2022 | Banerjee | H04L 67/535 |
| 2022/0300336 | A1* | 9/2022 | Major | G06F 9/546 |

OTHER PUBLICATIONS

Pham et al. "Predicting Workflow Task Execution Time in the Cloud Using a Two-Stage Machine Learning Approach," in IEEE Transactions on Cloud Computing, vol. 8, No. 1, pp. 256-268, Jan. 1-Mar. 2020.*

S. Secci and S. Murugesan, "Cloud Networks: Enhancing Performance and Resiliency," in Computer, vol. 47, No. 10, pp. 82-85, Oct. 2014, doi: 10.1109/MC.2014.277. (Year: 2014).*

J. Yuan, S. Ding and C. Wang, "Tasks Scheduling Based on Neural Networks in Grid," Third International Conference on Natural Computation (ICNC 2007), Haikou, China, 2007, pp. 372-376, doi: 10.1109/ICNC.2007.704 (Year: 2007).*

Anonymous. "Prediction of job resource usage based on large amount of historical data." Published Nov. 10, 2016. 3 pages. Published by IP.com. https://priorart.ip.com/IPCOM/000248232.

Barsanti, L., et al., "Adaptive Job Scheduling via Predictive Job Resource Allocation." Published May 2007. 23 pages. Published by Springer. https://link.springer.com/chapter/10.1007/978-3-540-71035-6_6.

Jiang, H., et al., "Multi-prediction based scheduling for hybrid workloads in the cloud data center." Published Jun. 4, 2018. 16 pages. Published by Springer. https://link.springer.com/article/10.1007/s10586-018-2265-1.

Mell, et al., "The NIST Definition of Cloud Computing," Recommendations of the National Institute of Standards and Technology, U.S. Department of Commerce, Special Publication 800-145, Sep. 2011, 7 pgs.

Rubab, S., et al., "Representing Job Scheduling for Volunteer Grid Environment using Online Container Stowage." Published Dec. 2016. 9 pages. vol. 7, No. 12. Published by International Journal of Advanced Computer Science and Applications. https://thesai.org/Publications/ViewPaper?Volume=7&Issue=12&Code=IJACSA&SerialNo=44.

* cited by examiner

COGNITIVE TASK SCHEDULER

BACKGROUND

The present disclosure relates generally to the field of cognitive scheduling of tasks, and more specifically to scheduling a task for cloud computing based on predicted future computing tasks.

Cloud computing is a model of service delivery for enabling convenient, on-demand network access to a shared pool of configurable computing resources that can be rapidly provisioned and released with low management effort or interaction with a provider of the service.

SUMMARY

Embodiments of the present disclosure include a method, computer program product, and system for scheduling a task for cloud computing based on predicted future computing tasks.

A processor may receive a request for a new computing task to be scheduled. The processor may identify that the new computing task requires processing in a cloud computing environment. The processor may identify resource needs of the new computing task. The processor may predict, utilizing an AI model, a future computing task based on the new computing task, where the future computing task requires processing at a future time in the cloud computing environment. The processor may identify resource needs of the future computing task. The processor may select one or more computing node hosts for processing the new computing task based on the future computing task.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
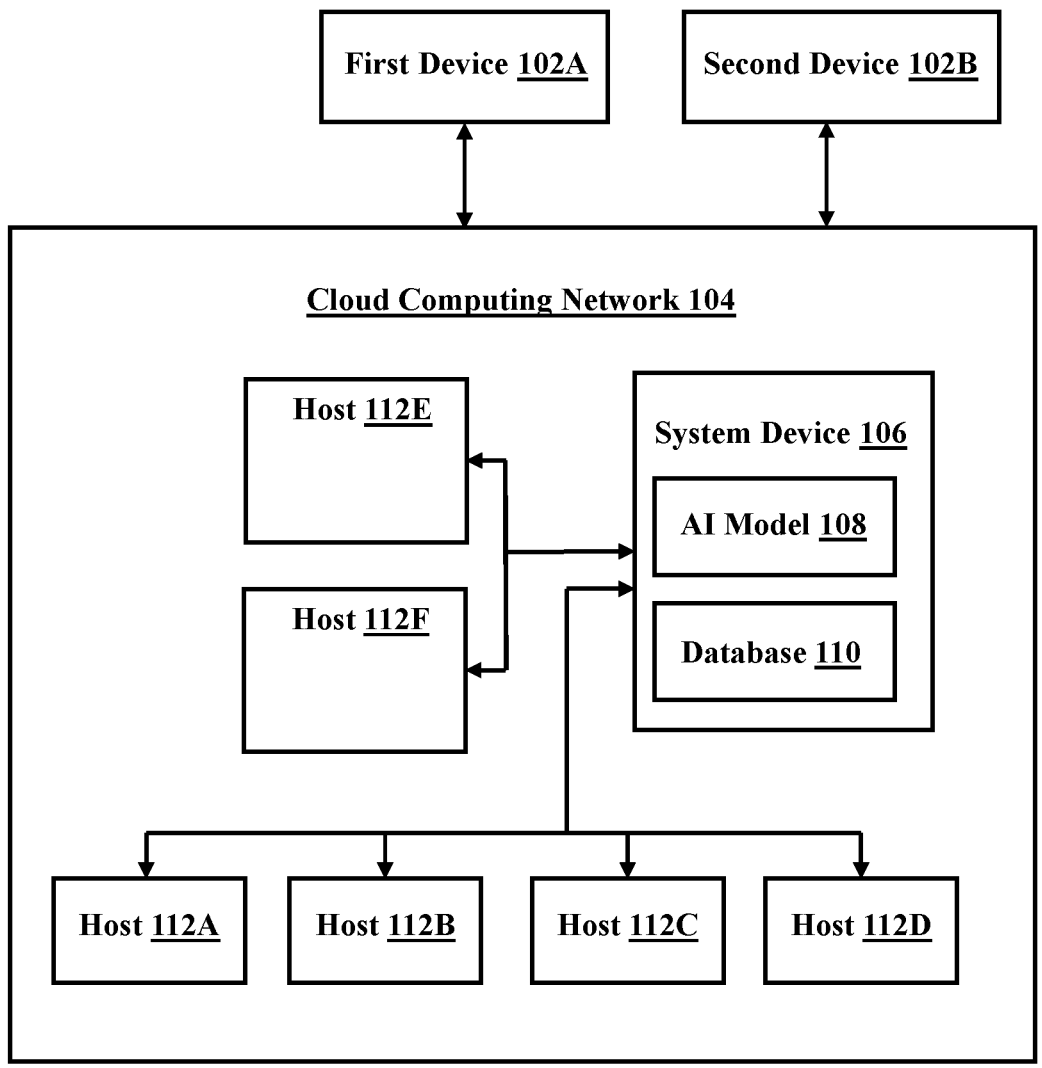
FIG. 1 is a block diagram of an exemplary system for cognitive scheduling of tasks, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cognitive task scheduling, and more specifically to scheduling a task for cloud computing based on predicted future computing tasks. While the present disclosure is not necessarily limited to such applications, various aspects of the disclosure may be appreciated through a discussion of various examples using this context.

In some embodiments, a processor may receive a request for a new computing task to be scheduled. In some embodiments, a processor may identify that the new computing task requires processing in a cloud computing environment. In some embodiments, the processor may identify the resource needs of the new computing task. In some embodiments, the new computing task may be identified from a queue for tasks to be scheduled. In some embodiments, the processor may identify the resources needed for the computing task to be processed in the cloud computing environment by the host. In some embodiments, the resources may include, a number of processing units (e.g., GPUs and CPUs), memory, disk space, software licenses, etc. In some embodiments, the resource needs may be detailed in the request for the new computing task. In some embodiments, the resource needs may be determined by an artificial intelligence model trained to predict resource needs of computing tasks. In some embodiments, the resource needs may be determined by accessing data regarding resource needs for various types of tasks in a database.

In some embodiments, the processor may predict, utilizing an AI model, a future computing task based on the new computing task. In some embodiments, the future computing task may require processing at a future time in the cloud computing environment. In some embodiments, the processor may identify resource needs of the future computing task. In some embodiments, the AI model may be trained to make predictions about the occurrence of future computing tasks. In some embodiments, the AI model may be trained to predict the timing of a request for additional tasks (e.g., the future computing task) based on the timing and attributes of another request for a computing task. In some embodiments, the attributes of the other task may include, a submission date and time, the user making the request for the task, a project that the task relates to, the run-time of the task, the resource usage of the task, the task input/output, attributes of the queue, finish time for the task, the exit status of the task, resource usage ratio of execution host (e.g., usage ratio of CPU, memory, etc.), etc.

In some embodiments, the AI model may be trained to make predictions about the attributes of the future computing tasks. In some embodiments, the attributes of the future computing tasks may include, the runtime of the future computing task, the submission time of the future computing task, the number of future computing tasks, etc. In some embodiments, the AI model may be trained to make predictions about the resource needs of the future computing tasks. In some embodiments, the AI model may predict the resources needed for the computing task to be processed in a cloud computing environment by the host. In some embodiments, the resources may include, number of processing units (e.g., GPUs and CPUs), memory, disk space, software licenses, etc. In some embodiments, the resource needs of the future computing task may be determined by accessing data regarding resource needs for various types of tasks in a database.

In some embodiments, the processor may select one or more computing node hosts for processing the new computing task based on the future computing task. In some embodiments, the processor may select the one or more computing node hosts based on the predicted time of the request for the future computing task. In some embodiments, the processor may select the one or more computing node hosts based on whether the new computing task and the future computing task are predicted to be running and require resources of the host at the same time. In some embodiments, the processor may select the one or more computing node hosts based on whether the future computing task is predicted to require resources of the hosts within a certain time period after the new computing task requires resources from the hosts. In some embodiments, the processor may select the one or more computing node hosts based on the resource needs of the new computing task and the future computing task. For example, a new computing task may require 0.5 GB of memory and a future computing task may be predicted to be requested requiring 2 GB of memory. The timing and runtimes of the two tasks are predicted to lead to the two tasks overlapping, and therefore one host with 4 GB of memory may be selected for the new computing task.

In some embodiments, selecting one or more computing node hosts for processing the new computing task may include determining whether the future computing task is predicted to begin before the new computing task is predicted to end. For example, if the new computing task has a runtime of 2 hours, and the AI model predicts that the future computing task may be received 20 minutes after the new computing task is received and has a runtime of 45 minutes, then depending on how soon after a request to schedule a task is made the task begins processing in the cloud, the processor may determine that future computing task is predicted to begin before the new computing task is predicted to end.

In some embodiments, the processor may determine aggregate resource needs of the new computing task and the future computing task. For example, if the new computing task requires 3 CPUs and the future computing task requires CPU 1, at the time when both the new computing task and the future computing task are being processed/running, the number of processors needed and the memory needed to process/run the tasks may be summed. In some embodiments, some resource needs may not be summed if those resources can be shared by the two tasks (e.g., power required to run background processes in the cloud data servers).

In some embodiments, the processor may identify currently running computing tasks. In some embodiments, the processor may determine the resource needs of the currently running computing tasks. In some embodiments, the processor may identify one or more current hosts on which the currently running computing tasks are being processed. In some embodiments, the processor may determine resources of the one or more current hosts required by the currently running computing tasks. For example, a computing task requiring 22 CPUs may be currently running on three hosts. The first host may have 4 CPUs, all of which are being used by the currently running computing task. The second host may have 8 CPUs, all of which are being used by the currently running computing task. The third host may have 12 CPUs, 10 of which are being used by the currently running computing task.

In some embodiments, the processor may determine available resources of the one or more current hosts. In some embodiments, the processor may compare the aggregate resource needs of the new computing task and the future computing task with the available resources of the one or more current hosts. Continuing the previous example, the current hosts have 2 CPUs that are not currently running any task, and the aggregate resource needs of the new computing task and the future computing task is 4 CPUs. Based on this comparison, the processor may that an additional 2 CPUs are needed for the processing of the new computing task and the future computing task.

In some embodiments, selecting one or more computing node hosts for processing the new computing task may include identifying the resources of the one or more computing node hosts. In some embodiments, the processor may select the one or more computing node hosts based on compliance with a selection criterion. For example, the new computing task and any future computing tasks that are predicted to be initiated before the new computing task has finished may require 14 CPUs. Many computing node hosts may be available for selection. The computing node hosts available for selection may have different characteristics. For example, type A computing node hosts may have 4 CPUs, type B computing node hosts may have 8 CPUs, and type C computing node hosts may have 32 CPUs. The type A, type B, and type C hosts may also have different costs (e.g., cost for using the host) and different locations (e.g., locations where the cloud server is located) associated with them. The new computing task and the future computing task may be performed on two type B hosts, two type A hosts and one type B host, four type A hosts, or one type C hosts.

The selection of the one or more computing node hosts for processing the new computing task (and the future computing task when it is requested in the future) may be based, in addition to the resource needs of the new and future computing tasks, on other selection criterion. The selection criterion may include, minimizing costs for the hosts, minimizing the number of different hosts, increasing the number of different hosts, increasing the geographic distribution (e.g., based on location of the servers) of the hosts, decreasing the geographic distribution of the hosts, optimizing the availability of resources (e.g., computing resources on the hosts) for the cost (e.g., if a 20 CPU and a 16 CPU host cost the same, selecting the 20 CPU host, even if the additional 4 CPUs are not needed to process the new and predicted future computing tasks), etc.

In some embodiments, the processor may determine to return a host of the one or more computing node hosts or the one or more current hosts. For example, a host may be returned if no new computing tasks have arrived, or future computing tasks are predicted to arrive, that require resources that cannot be met by other hosts (e.g., hosts that are currently running tasks or have already been selected) within a certain time period. In some embodiments, the time period is determined by the AI model. In some embodiments, the time period is set by an administrator or user of the system.

Referring now to FIG. 1, a block diagram of a system 100 for cognitive task scheduling is illustrated. System 100 includes a first device 102A, a second device 102B, and a cloud computing network 104. The cloud computing network 104 includes a system device 106 on which an AI model 108 operates. The cloud computing network 104 also includes computing node hosts 112A, 112B, 112C, 112D, 112E, and 112F. The first device 102A, second device 102B, system device 106, and computing node hosts 112A, 112B, 112C, 112D, 112E, and 112F are configured to be in communication with each other. The first device 102A, the second device 102B and the system device 106 may be any devices that contain a processor configured to perform one or more of the functions or steps described in this disclosure.

In some embodiments, the system device 106 receives a request for a new computing task to be scheduled from the first device 102A. In some embodiments, the system device 106 identifies that the new computing task requires processing in a cloud computing environment. In some embodiments, the system device 106 identifies resource needs of the new computing task by accessing database 110. In some embodiments, the system device 106 predicts, using AI model 108, a future computing task (which could come from first device 102A or second device 102B) based on the new computing task. In some embodiments, the future computing task requires processing at a future time in the cloud computing environment. In some embodiments, the system device 106 identifies resource needs of the future computing task. In some embodiments, the system device 106 selects one or more computing node hosts (e.g., computing node hosts 112A, 112B, 112C, 112D, 112E, and 112F) for processing the new computing task based on the future computing task.

In some embodiments, the system device 106 determines whether the future computing task is predicted to begin before the new computing task is predicted to end. In some embodiments, the system device 106 determines aggregate resource needs of the new computing task and the future computing task when the future computing task is predicted to begin before the new computing task is predicted to end. In some embodiments, the system device 106 identifies the resources of the one or more computing node hosts (e.g., on computing node hosts 112A, 112B, 112C, 112D, 112E, and 112F). In some embodiments, the system device 106 selects the one or more computing node hosts (e.g., on computing node hosts 112A, 112B, 112C, 112D, 112E, and 112F) based on compliance with a selection criterion, such as minimization of costs for using the computing node hosts.

In some embodiments, the system device 106 identifies one or more currently running computing tasks (e.g., on computing node hosts 112A, 112B, 112C, 112D). In some embodiments, the system device 106 determines resource needs of the one or more currently running computing tasks. In some embodiments, the system device 106 identifies one or more current hosts on which the one or more currently running computing tasks are being processed (e.g., computing node hosts 112A, 112B, 112C, 112D). In some embodiments, the system device 106 determines resources of the one or more current hosts required by the one or more currently running computing tasks.

In some embodiments, the system device 106 determines available resources of the one or more current hosts (e.g., computing node hosts 112A, 112B, 112C, 112D). In some embodiments, the system device 106 compares the aggregate resource needs of the new computing task and the future computing task with the available resources of the one or more current hosts (e.g., computing node hosts 112A, 112B, 112C, 112D).

In some embodiments, the system device 106 determines, using the AI model 108, to return a host of the one or more computing node hosts (e.g., on computing node hosts 112A, 112B, 112C, 112D, 112E, and 112F) or the one or more current hosts (e.g., computing node hosts 112A, 112B, 112C, 112D).

Figure 2:
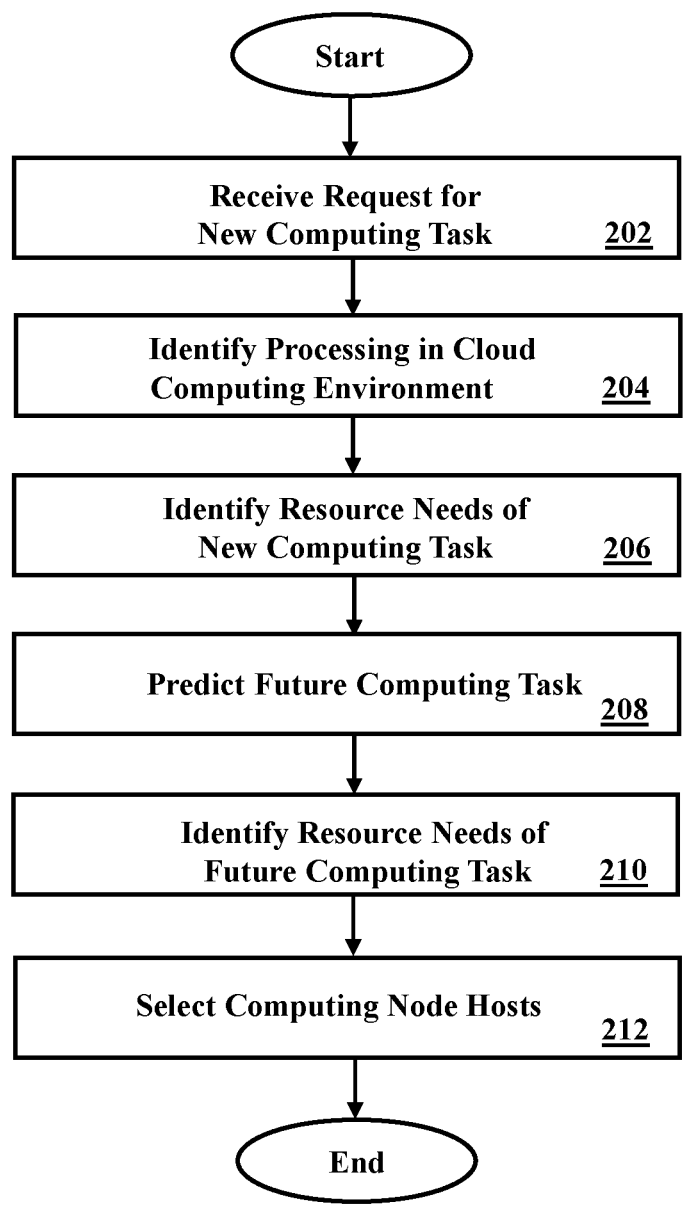
FIG. 2 is a flowchart of an exemplary method for cognitive scheduling of tasks, in accordance with aspects of the present disclosure.

Referring now to FIG. 2, illustrated is a flowchart of an exemplary method 200 for cognitive task scheduling, in accordance with embodiments of the present disclosure. In some embodiments, a processor of a system may perform the operations of the method 200. In some embodiments, method 200 begins at operation 202. At operation 202, the processor receives a request for a new computing task to be scheduled. In some embodiments, method 200 proceeds to operation 204, where the processor identifies that the new computing task requires processing in a cloud computing environment. In some embodiments, method 200 proceeds to operation 206. At operation 206, the processor identifies resource needs of the new computing task. In some embodiments, method 200 proceeds to operation 208. At operation 208, the processor predicts, utilizing an AI model, a future computing task based on the new computing task. In some embodiments, method 200 proceeds to operation 210. At operation 210, the processor identifies resource needs of the future computing task. In some embodiments, method 200 proceeds to operation 212. At operation 212, the processor selects one or more computing node hosts for processing the new computing task based on the future computing task. In some embodiments, after operation 212, the method 200 may end.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
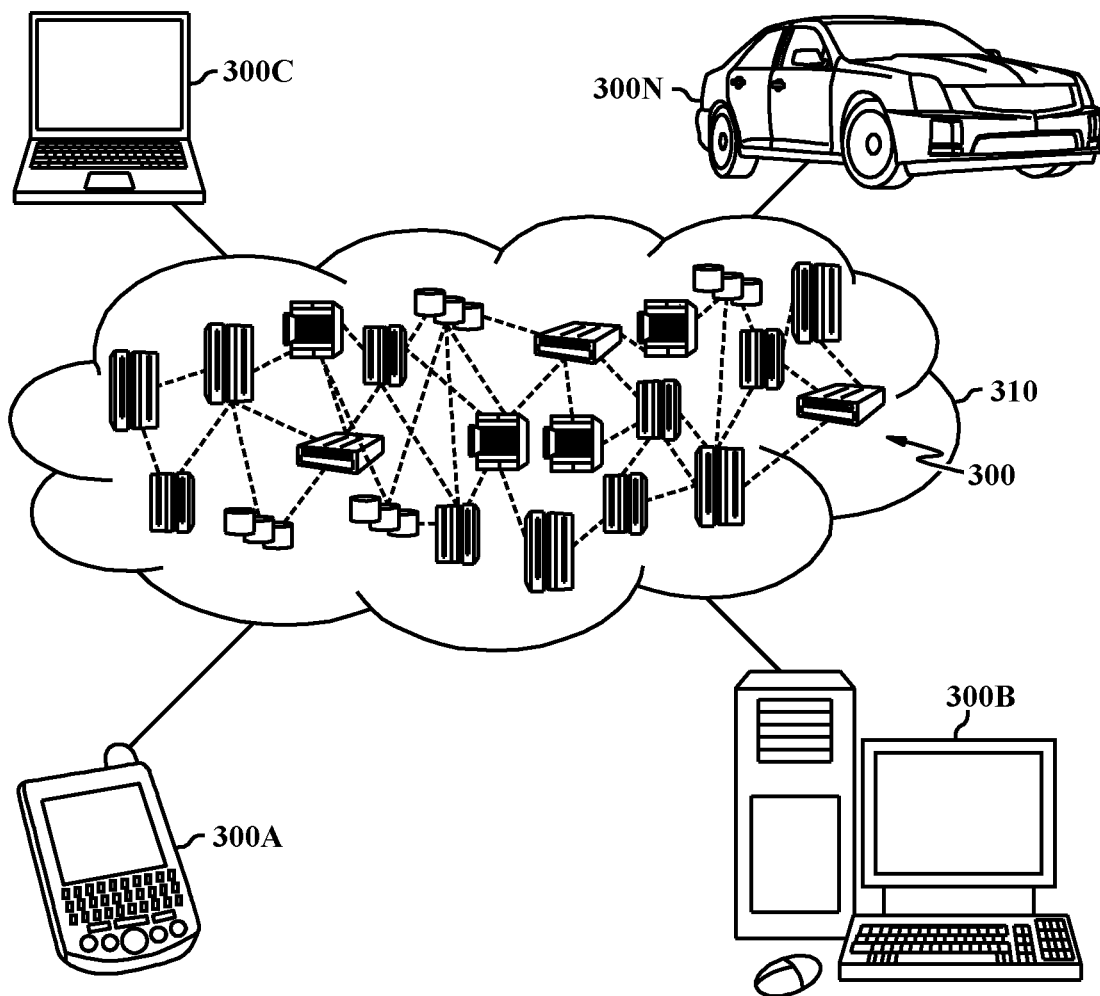
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
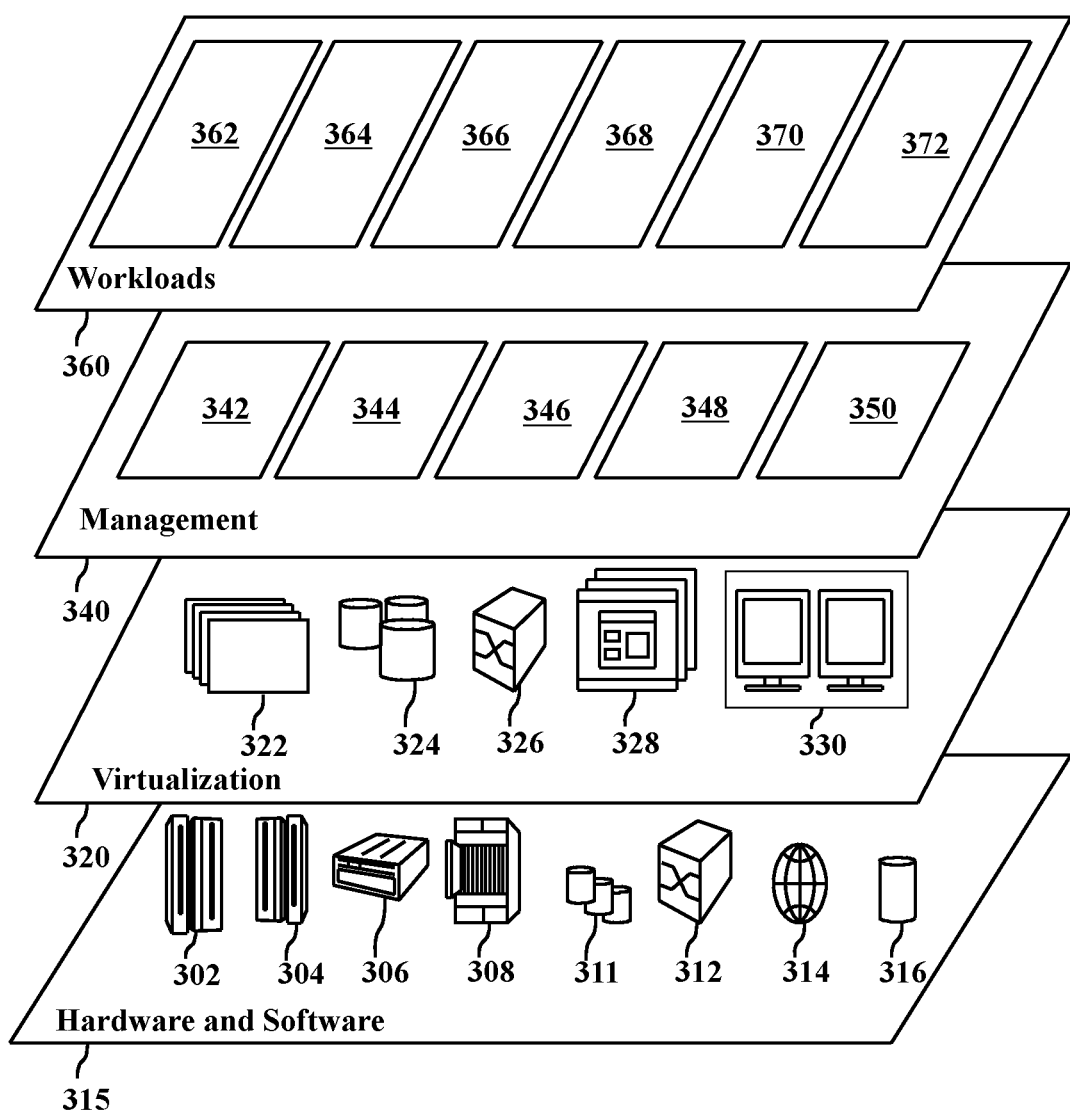
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and cognitive scheduling of tasks 372.

Figure 4:
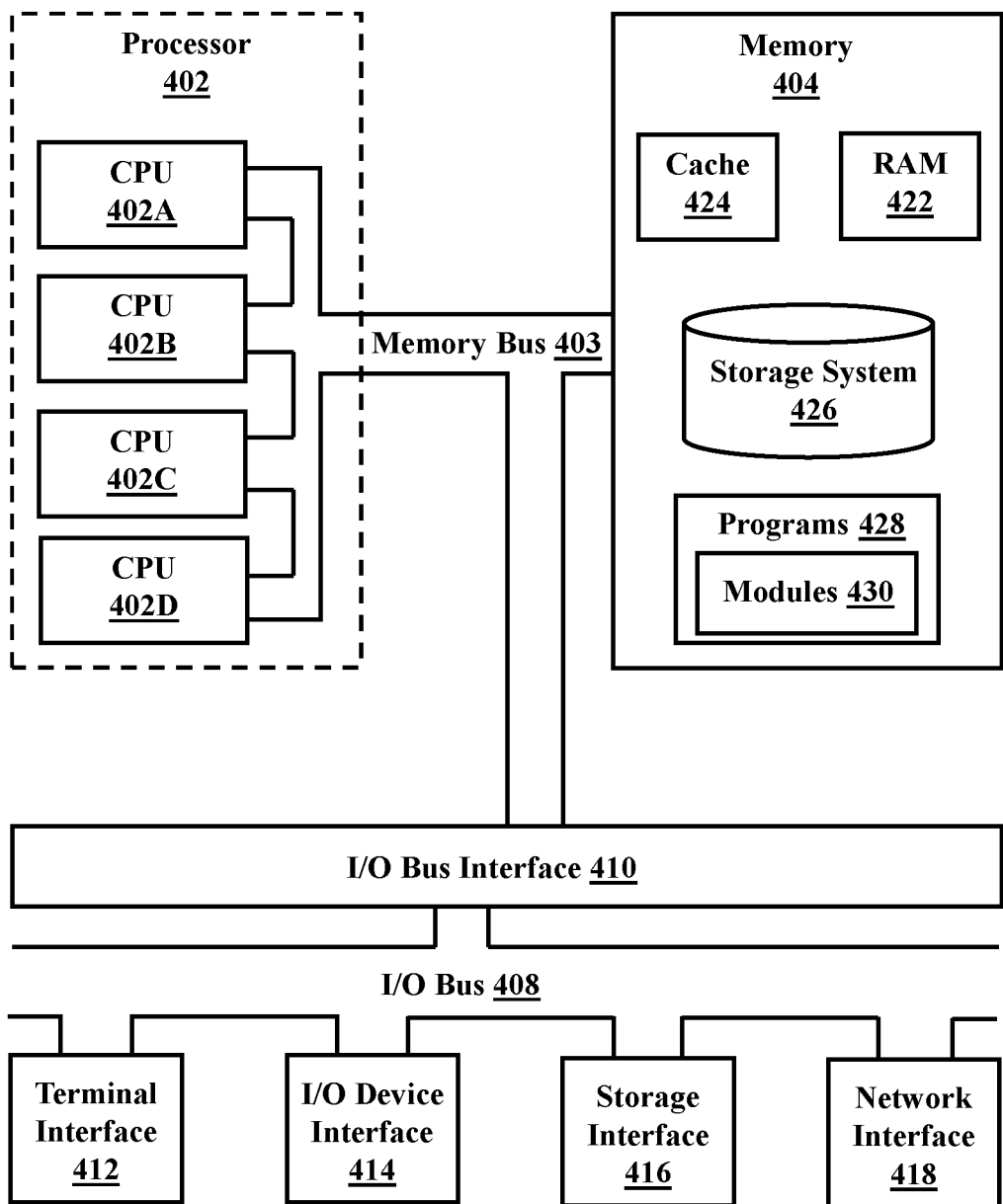
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for cognitive task scheduling, the method comprising:
   receiving, by a processor, a request for a new computing task to be scheduled;
   identifying that the new computing task requires processing in a cloud computing environment;
   identifying resource needs of the new computing task, wherein the resource needs includes the use of a software license;
   predicting, utilizing an AI model, a future computing task based on the new computing task, wherein the future computing task requires processing at a future time in the cloud computing environment;
   predicting, utilizing the AI model, a future computing task timing and a future computing task runtime, wherein the future computing task timing is a submission time of the future computing task;

predicting, utilizing the AI model, that the future computing task runtime will overlap with a new computing task runtime based on the future computing task timing;

identifying resource needs of the future computing task; and selecting one or more computing node hosts for processing the new computing task based on the resource needs of the new computing task, the resource needs of the future computing task, the new computing task runtime, the future computing task timing, and a selection criterion, wherein the selection criterion is selected from the group consisting of minimizing number of different hosts and increasing the number of different hosts.

2. The method of claim 1, wherein selecting one or more computing node hosts for processing the new computing task includes:

determining whether the future computing task is predicted to begin before the new computing task is predicted to end; and determining aggregate resource needs of the new computing task and the future computing task.

3. The method of claim 2, wherein selecting one or more computing node hosts for processing the new computing task further includes:

identifying one or more currently running computing tasks;

determining resource needs of the one or more currently running computing tasks;

identifying one or more current hosts on which the one or more currently running computing tasks are being processed; and determining resources of the one or more current hosts required by the one or more currently running computing tasks.

4. The method of claim 3, wherein selecting one or more computing node hosts for processing the new computing task includes:

determining available resources of the one or more current hosts; and comparing the aggregate resource needs of the new computing task and the future computing task with the available resources of the one or more current hosts.

5. The method of claim 1, wherein selecting one or more computing node hosts for processing the new computing task includes:

identifying the resources of the one or more computing node hosts.

6. The method of claim 1, further comprising:

determining, using the AI model, to return a host of the one or more computing node hosts or one or more current hosts.

7. A system comprising:

a memory; and a processor in communication with the memory, the processor being configured to perform operations comprising:

receiving a request for a new computing task to be scheduled;

identifying that the new computing task requires processing in a cloud computing environment;

identifying resource needs of the new computing task, wherein the resource needs includes the use of a software license;

predicting, utilizing an AI model, a future computing task based on the new computing task, wherein the future computing task requires processing at a future time in the cloud computing environment;

predicting, utilizing the AI model, a future computing task timing and a future computing task runtime, wherein the future computing task timing is a submission time of the future computing task;

predicting, utilizing the AI model, that the future computing task runtime will overlap with a new computing task runtime based on the future computing task timing;

identifying resource needs of the future computing task; and selecting one or more computing node hosts for processing the new computing task based on the resource needs of the new computing task, the resource needs of the future computing task, the new computing task runtime, the future computing task timing, and a selection criterion, wherein the selection criterion is selected from the group consisting of minimizing number of different hosts and increasing the number of different hosts.

8. The system of claim 7, wherein selecting one or more computing node hosts for processing the new computing task includes:

determining whether the future computing task is predicted to begin before the new computing task is predicted to end; and determining aggregate resource needs of the new computing task and the future computing task.

9. The system of claim 8, wherein selecting one or more computing node hosts for processing the new computing task further includes:

identifying one or more currently running computing tasks;

determining resource needs of the one or more currently running computing tasks;

identifying one or more current hosts on which the one or more currently running computing tasks are being processed; and determining resources of the one or more current hosts required by the one or more currently running computing tasks.

10. The system of claim 9, wherein selecting one or more computing node hosts for processing the new computing task includes:

determining available resources of the one or more current hosts; and comparing the aggregate resource needs of the new computing task and the future computing task with the available resources of the one or more current hosts.

11. The system of claim 7, wherein selecting one or more computing node hosts for processing the new computing task includes:

identifying the resources of the one or more computing node hosts.

12. The system of claim 7, further comprising:

determining, using the AI model, to return a host of the one or more computing node hosts or one or more current hosts.

13. A computer program product comprising a computer readable storage medium having program instructions embodied therewith, the program instructions executable by a processor to cause the processor to perform operations, the operations comprising:

receiving a request for a new computing task to be scheduled;

identifying that the new computing task requires processing in a cloud computing environment;

identifying resource needs of the new computing task, wherein the resource needs includes the use of a software license;
predicting, utilizing an AI model, a future computing task based on the new computing task, wherein the future computing task requires processing at a future time in the cloud computing environment;
predicting, utilizing the AI model, a future computing task timing and a future computing task runtime, wherein the future computing task timing is a submission time of the future computing task;
predicting, utilizing the AI model, that the future computing task runtime will overlap with a new computing task runtime based on the future computing task timing;
identifying resource needs of the future computing task; and
selecting one or more computing node hosts for processing the new computing task based on the resource needs of the new computing task, the resource needs of the future computing task, the new computing task runtime, the future computing task timing, and a selection criterion wherein the selection criterion is selected from the group consisting of minimizing number of different hosts, increasing the number of different hosts.

14. The computer program product of claim 13, wherein selecting one or more computing node hosts for processing the new computing task includes:
determining whether the future computing task is predicted to begin before the new computing task is predicted to end; and
determining aggregate resource needs of the new computing task and the future computing task.

15. The computer program product of claim 14, wherein selecting one or more computing node hosts for processing the new computing task further includes:
identifying one or more currently running computing tasks;
determining resource needs of the one or more currently running computing tasks;
identifying one or more current hosts on which the one or more currently running computing tasks are being processed; and
determining resources of the one or more current hosts required by the one or more currently running computing tasks.

16. The computer program product of claim 15, wherein selecting one or more computing node hosts for processing the new computing task includes:
determining available resources of the one or more current hosts; and
comparing the aggregate resource needs of the new computing task and the future computing task with the available resources of the one or more current hosts.

17. The computer program product of claim 13, wherein selecting one or more computing node hosts for processing the new computing task includes:
identifying the resources of the one or more computing node hosts.

18. The computer program product of claim 13, further comprising:
determining, using the AI model, to return a host of the one or more computing node hosts or one or more current hosts.

* * * * *